(12) United States Patent
Beck et al.

(10) Patent No.: US 11,899,840 B2
(45) Date of Patent: Feb. 13, 2024

(54) HAPTIC EMULATION OF INPUT DEVICE

(71) Applicant: Lenovo (Singapore) Pte. Ltd., Singapore (SG)

(72) Inventors: Kevin Wayne Beck, Raleigh, NC (US); Russell Speight VanBlon, Raleigh, NC (US); Thorsten Peter Stremlau, Morrisville, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 99 days.

(21) Appl. No.: 17/210,014

(22) Filed: Mar. 23, 2021

(65) Prior Publication Data
US 2022/0308669 A1 Sep. 29, 2022

(51) Int. Cl.
*G06F 3/01* (2006.01)
*G06F 3/04886* (2022.01)

(52) U.S. Cl.
CPC .......... *G06F 3/016* (2013.01); *G06F 3/014* (2013.01); *G06F 3/04886* (2013.01)

(58) Field of Classification Search
CPC ....... G06F 3/016; G06F 3/014; G06F 3/04886
USPC ............................................ 340/407.2, 407.1
See application file for complete search history.

(56) References Cited

U.S. PATENT DOCUMENTS

| | | | | |
|---|---|---|---|---|
| 10,924,651 | B2* | 2/2021 | Chaudhri | H04L 65/764 |
| 2016/0363997 | A1* | 12/2016 | Black | G06F 3/014 |
| 2017/0319950 | A1* | 11/2017 | Buchanan, IV | A63F 13/21 |
| 2019/0251750 | A1* | 8/2019 | Brewer | G06F 3/0304 |
| 2021/0096649 | A1* | 4/2021 | Mok | G06F 3/016 |

OTHER PUBLICATIONS

NPL Romano et al "Creating Realistic Virtual Textures from Contact Acceleration Data", IEEE Transactions on Haptics, vol. 5, No. 2, Apr.-Jun. 2012.*

* cited by examiner

*Primary Examiner* — Quan Zhen Wang
*Assistant Examiner* — Mancil Littlejohn, Jr.
(74) *Attorney, Agent, or Firm* — Ference & Associates LLC

(57) ABSTRACT

One embodiment provides a method, including: detecting, using a processor of an information handling device and in a virtual environment, a user input directed to a virtual human input device; accessing, from a data store, sensation data associated with user interaction with a real-world counterpart device of the virtual human input device; and providing, based on the sensation data and using a wearable haptic device, a haptic output responsive to the user input, wherein the haptic output emulates an interaction feel of the user input provided to the real-world counterpart device. Other aspects are described and claimed.

18 Claims, 3 Drawing Sheets

HAPTIC EMULATION OF INPUT DEVICE

BACKGROUND

As technology progresses, an increased number of information handling devices ("devices"), for example wearable devices such as head-mounted displays (HMDs), have augmented reality and/or virtual reality capabilities. In the case of the former, digital content (e.g., images, sounds, haptic effects, etc.) may be superimposed over real-world scenes on a display of the device. With respect to the latter, a user may be visually immersed in a virtual world and fully surrounded by virtual objects. In both situations, users may interact with and/or affect the virtual content/environment by providing inputs to a virtual human input device (e.g., a virtual keyboard, a virtual joystick, a virtual trackpad, etc.).

BRIEF SUMMARY

In summary, one aspect provides a method, including: detecting, using a processor of an information handling device and in a virtual environment, a user input directed to a virtual human input device; accessing, from a data store, sensation data associated with user interaction with a real-world counterpart device of the virtual human input device; and providing, based on the sensation data and using a wearable haptic device, a haptic output responsive to the user input, wherein the haptic output emulates an interaction feel of the user input provided to the real-world counterpart device.

Another aspect provides an information handling device, including: a sensor; a wearable haptic device; a processor; a memory device that stores instructions executable by the processor to: display a virtual object; detect, in a virtual environment, a user input directed to a virtual human input device; access, from a data store, sensation data associated with user interaction with a real-world counterpart device of the virtual human input device; and provide, based on the sensation data and using a wearable haptic device, a haptic output responsive to the user input, wherein the haptic output emulates an interaction feel of the user input provided to the real-world counterpart device.

A further aspect provides a product, including: a storage device that stores code, the code being executable by a processor and comprising: code that detects, in a virtual environment, a user input directed to a virtual human input device; code that accesses, from a data store, sensation data associated with user interaction with a real-world counterpart device of the virtual human input device; and code that provides, based on the sensation data and on a wearable haptic device, a haptic output responsive to the user input, wherein the haptic output emulates an interaction feel of the user input provided to the real-world counterpart device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
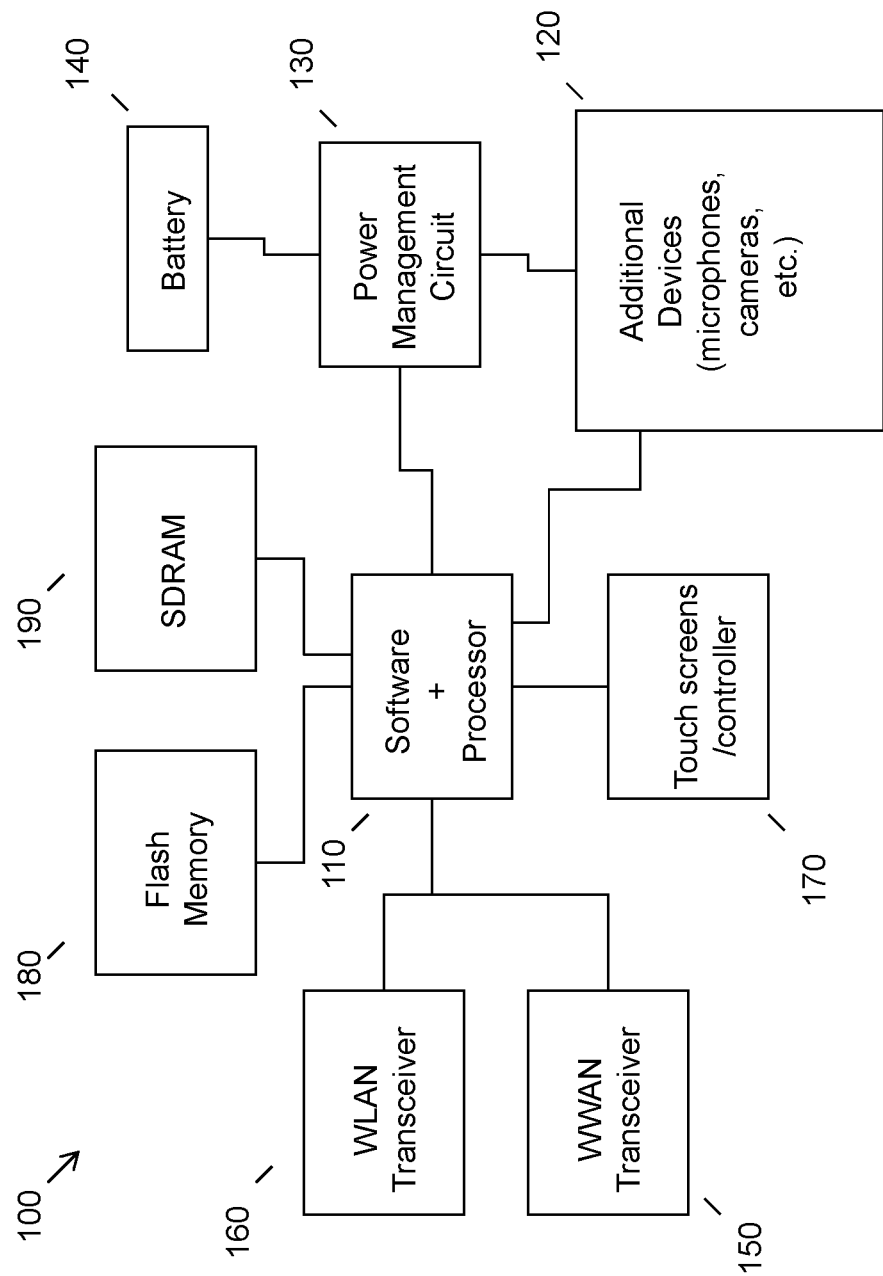
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A user may interact with a variety of different types of augmented reality ("AR") objects or virtual reality ("VR") objects by using various input means. For example, a user may utilize one or more wearable devices (e.g., haptic gloves, etc.) to provide inputs to a virtual human interface device ("HID") present in the virtual environment (e.g., a virtual keyboard, a virtual joystick, a virtual trackpad, etc.). Although effective in interacting with the virtual world, conventional methods of virtual environment interaction may feel synthetic and/or alien to a user. More particularly, the virtual HID may not have the same signature action/feel that a user may be accustomed to experiencing when interacting with a real-world HID.

The perceived kinesthetic and tactile feedback a user experiences with a given real-world HID is a function of mechanical properties of that HID (e.g., surface textures, activation forces, etc.) as well as the anthropometric characteristics of the user (e.g., finger size, finger trajectory, input posture and/or orientation, etc.). No solutions currently exist that enable personalization of the perceived kinesthetic and tactile feedback of a virtualized counterpart of a familiar real-world HID.

Accordingly, an embodiment provides a method for emulating a real-world feel for interaction with a virtual HID. In an embodiment, a user input directed to a virtual HID may be detected at a device. An embodiment may then access, from a data store (e.g., stored locally on the device or stored externally on another device or server, etc.), sensation data associated with user interaction with a real-world counterpart device of the virtual HID. More particularly, the sensation data may include one or more different types of data metrics related to how interaction with the real-world counterpart device feels to the user in different contextual situations and environments. Thereafter, an embodiment may provide, using a wearable haptic device (e.g., a pair of haptic gloves, etc.), one or more haptic outputs responsive to the user input. These haptic outputs may emulate the real-world feel of interaction with the real-world counterpart of the virtual HID. Such a method may therefore improve a user's interaction experience with virtual objects and correspondingly more fully immerse them in the virtual experience.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
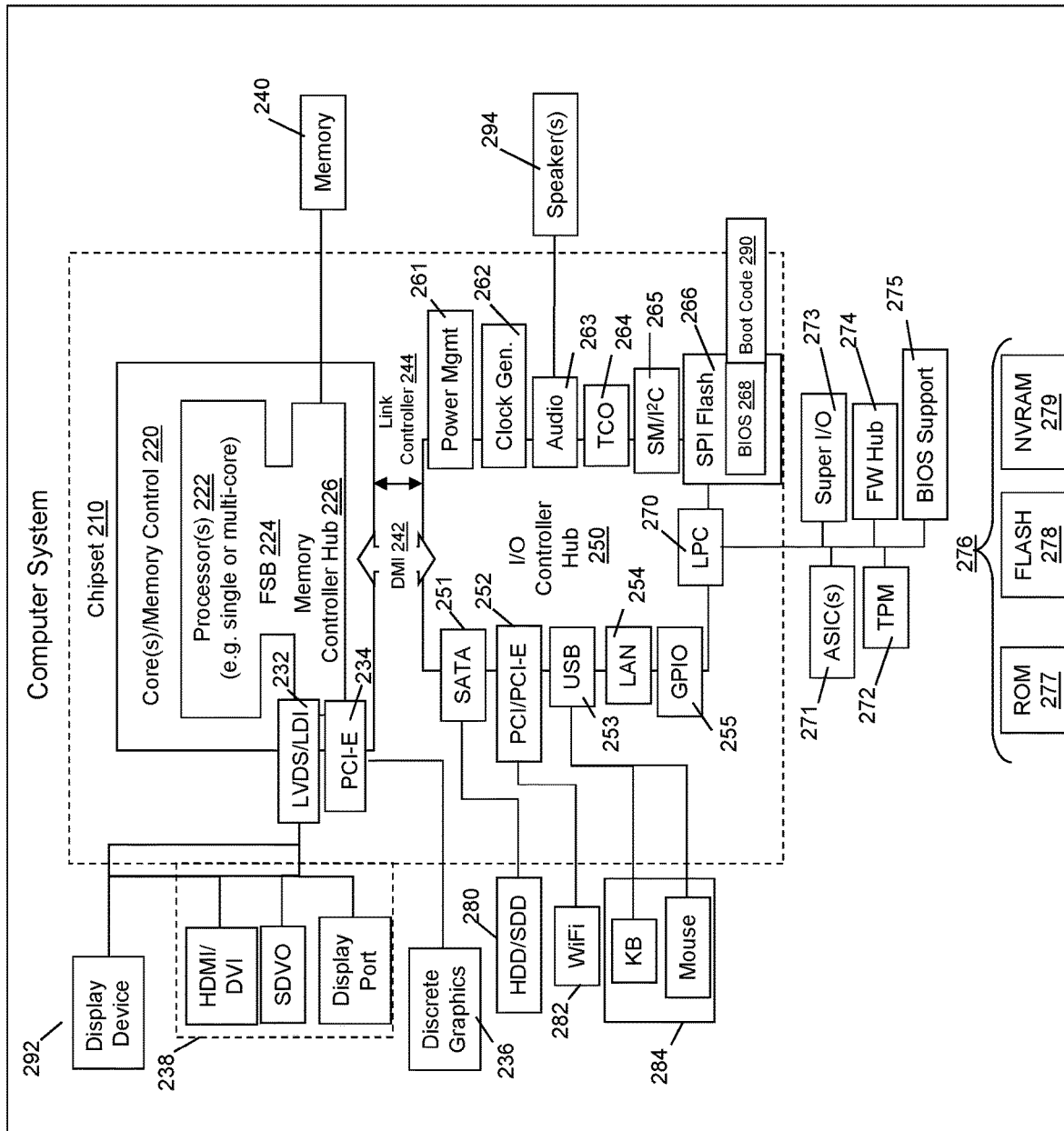
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of displaying augmented and/or virtual reality content. For example, the circuitry outlined in FIG. 1 may be implemented in a head mounted display, whereas the circuitry outlined in FIG. 2 may be implemented in a smart phone or tablet embodiment.

Figure 3:
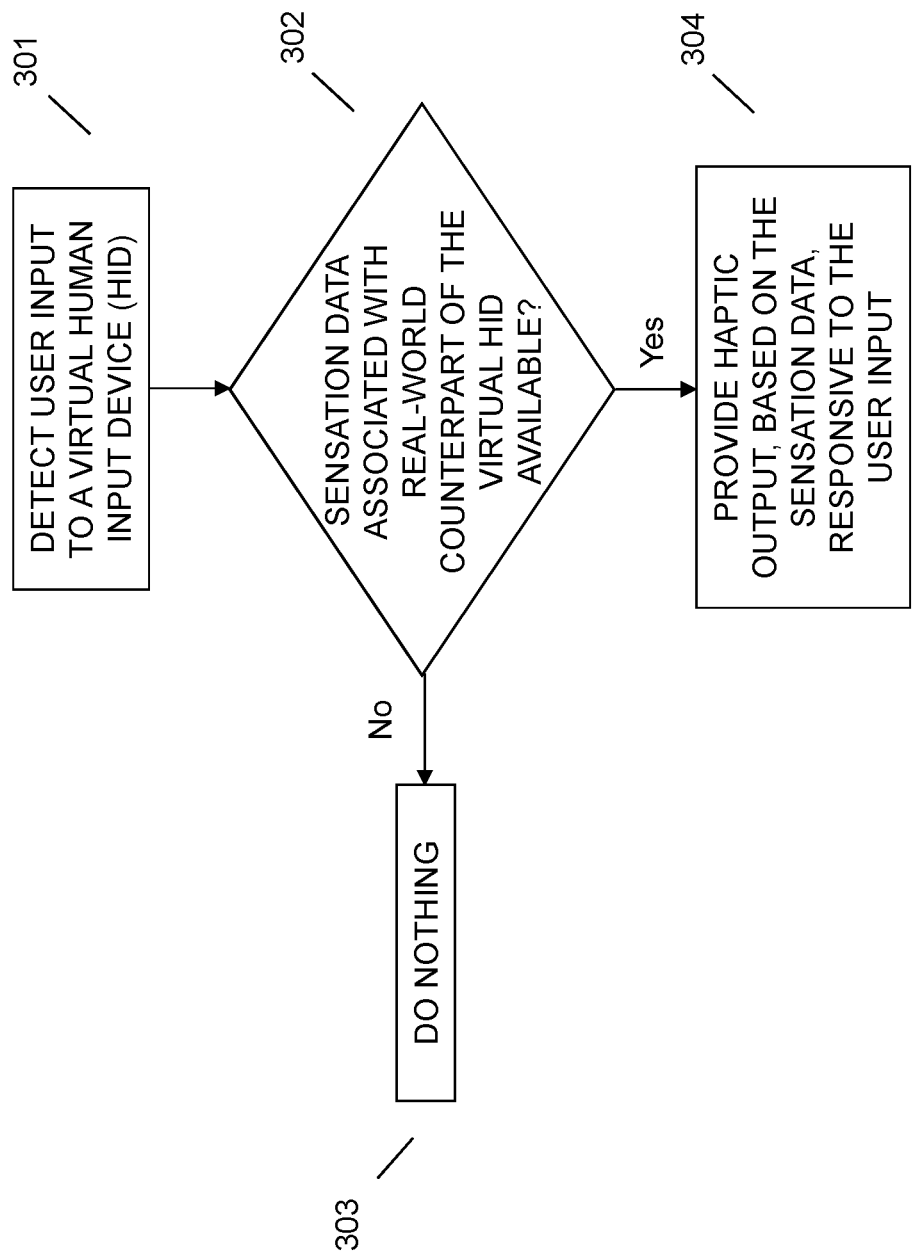
FIG. 3 illustrates an example method of emulating a real-world feel for interaction with a virtual human input device.

Referring now to FIG. 3, a method for generating a haptic effect that emulates the real-world feel of an HID is provided. At 301, an embodiment may detect a user input directed to a virtual HID. In the context of this application, a virtual HID may refer to one or more virtual input devices that a user may interact with to provide inputs to and/or to modify virtual objects and/or aspects of a virtual environment (e.g., an augmented reality environment, a virtual reality environment, etc.). Non-limiting examples of possible virtual HID may include a virtual keyboard, a virtual touchpad, a virtual mouse, a virtual joystick, a virtual stylus, and a virtual trackball. For simplicity purposes, the remainder of the discussion will focus on a user's interactions with a virtual keyboard. It is important to note, however, that such a designation is not limiting.

In an embodiment, the virtual environment containing the virtual HID may be initiated at a device capable of augmented reality and/or virtual reality capabilities (e.g., a head-mounted display (HMD), etc.). In an embodiment, detection of the user input to the virtual HID may be dependent upon the type of virtual environment a user is interacting with. For example, in an augmented reality environment, a virtual keyboard may be superimposed on a real-world surface (e.g., a table, etc.). A user may thereafter proceed to provide typing input to the virtual keyboard and one or more sensors (e.g., camera sensors, motion sensors, gaze location sensors, etc.) integrated into the device may accurately detect which keys of the virtual keyboard a user may be interacting with. Additionally or alternatively, in another example, in a virtual reality environment a user wearing haptic and/or motion tracking gloves may be able to provide detectable typing input to a virtualized keyboard.

At 302, an embodiment may access sensation data associated with user interaction with a real-world counterpart of the virtual HID. In the context of this application, sensation data refers to a signature action, or "feel", a user may experience when interacting with a real-world HID in a particular interaction context (e.g., a location of interaction, a surface of interaction, an orientation of interaction, etc.). In an embodiment, the sensation data may be stored at an accessible storage location (e.g., stored locally on the device or stored remotely on another device or server, etc.). In situations where multiple users utilize a singular device (e.g., a singular HMD, etc.), an embodiment may identify the current user (e.g., using one or more conventional user identification techniques known in the art, etc.) and thereafter access sensation data associated with that user.

In an embodiment, the sensation data may be acquired during a dedicated training phase. More particularly, during the training phrase a user may be instructed to provide inputs to an HID (e.g., using a specified force, at a specified orientation, at a specified speed, etc.), the aspects of which may subsequently be recorded. In an embodiment, each unique HID may have its own dedicated training phase. Alternatively to the foregoing, in the absence of a dedicated training phase the sensation data may be dynamically recorded during a user's normal utilization and interaction with a real-world HIDs. Stated differently, embodiments of the system may be able to passively collect interaction data with the real-world HID as the user naturally engages with it (e.g., over the course of the day, over the course of a particular activity, etc.).

The subsequent paragraphs describe a variety of different types of sensation data that may be accessed and thereafter utilized for one or more downstream processes. It is important to note that a system of the embodiments may access and utilize exclusively one type of sensation data or, alternatively, may access and utilize any number and combination of the sensation data types in the provision of haptic output, as further described in step 304.

In an embodiment, the sensation data may correspond to interaction force data. In the context of this application, interaction force data may correspond to the unique sequence and arrangement of forces, both exerted by and transmitted into, a user's fingers/hands while utilizing a specific HID. These forces may be detected and recorded by one or more internal and/or external sensors of a wearable haptic device (e.g., a haptic glove, etc.). In the case of keyboards, each key may have forces associated with it that may differ from the forces associated with the surrounding keys. For example, a system may associate the per-key input with the exact motion/force necessary to type it. More particularly, when utilizing a conventional typing hand placement, interaction with distantly placed keys (e.g., ESC, DEL, etc.) may have a different feel from interaction with the keys situated closer to the center of the keyboard. In an embodiment, the user's hand and/or finger size (e.g., determined using one or more camera sensors, area or force sensors in the haptic glove component, etc.) may further influence how certain keys "feel" when interacted with. For example, a user with small fingers generally applies less force to keys than a user with large fingers. Additionally or alternatively, a user with large hands may be able to more forcefully strike a distantly placed key than a user with smaller hands.

In an embodiment, the sensation data may correspond to one or more contextual aspects of a user's environment that the interaction occurs in. For instance, one or more sensors integrated into the device (e.g., camera sensors, haptic glove sensors, etc.) may be able to capture indications of the nature of the typing surface that the user utilizes to provide inputs to the HID (e.g., a wooden desk, table with tablecloth, thin air, etc.). A softer interaction surface such as air or a cushion will have more "give" and will present a different feel than a harder interaction surface. In another example, context data may be utilized to determine the size and/or classification of the available/usable space around the user. For example, an embodiment may leverage one or more camera sensors, location data (e.g., derived from Global Positioning System (GPS) information, etc.), and/or other types of context data (e.g., obtained from a user's calendar, communication exchanges, etc.) to identify the location and/or space that they are working in (e.g., their office, a car, a train, a plane, etc.). This location identification may further influence the way a user perceives the feeling of HID interaction (e.g., interaction with a keyboard in a user's office may feel different than interaction with the keyboard in a moving car or train, etc.).

In an embodiment, the sensation data may correspond to one or more types of input characteristic data. For example, various types of sensor information (e.g., image information obtained from camera sensors, accelerometer input obtained from accelerometers, orientation data obtained from gyroscopes, a combination of any of the foregoing, etc.) may be utilized to determine the orientation of the device and/or the orientation of the user in physical space or even in zero gravity (e.g., embodiments of the foregoing may be able to identify whether the user is standing upright, sitting down, lying down, positioned in a specific manner, etc.) during interaction. As another example, an inertial movement unit (IMU) and/or one or more positional sensors (e.g., a goniometer, etc.) may be utilized to determine the kinesthetic approach or trajectory a user may be utilizing with a particular type or sub-area of a given HID. More particularly, an embodiment may be able to identify whether a user generally strikes keys utilizing a formal typing posture (i.e., where a downward strike commences just above a key and contacts substantially the center portion of the key) or another input posture (e.g., a single finger typing posture where the strike commences a greater distance above the key, an angled typing posture wherein the force is applied to a non-center portion of the key, i.e., an upper or lower portion of the key, etc.). In yet another example, an embodiment may be able to leverage one or more of the foregoing sensors to identify a user's input speed (e.g., the speed at which a user is typing, etc.).

In an embodiment, the sensation data may correspond to audible sensations in addition to, or in lieu of, physical sensations. For example, one or more camera sensors and/or microphones may be utilized to capture the sound of a user's interaction with a keyboard or other HID device. In the case of the former, the striking of a centrally located key may produce a louder sound than the striking of a distantly placed key. Additionally or alternatively, the sound of interaction may be user dependent (i.e., some users interact with their keyboard more forcefully than others).

Responsive to identifying that sensation data for the real-world counterpart of the virtual HID does not exist, an embodiment may, at 303, take no additional action. Alternatively, an embodiment may provide a haptic output associated with the user input using conventional means (e.g., at a default haptic setting, etc.). Conversely, responsive to identifying that sensation data for the real-world counterpart of the virtual HID does exist, an embodiment may, at 304, provide haptic output to the user based on the sensation data. More particularly, the provided haptic output may emulate an interaction feel of the user input provided to the real-world counterpart device. A system may be able to more accurately emulate the interaction feel with the real-world HID in the virtual world based upon the number of sensation data metrics available to the system.

In an embodiment, the haptic output may be provided to the user via a wearable haptic device. For instance, a pair of haptic gloves may be a component of the overall system that the haptic output may be provided through. Characteristics of the haptic output may be adjusted based upon the sensation data. Accordingly, upon identification of the virtual HID a user is interacting with via the haptic gloves, as well as the context of interaction, an embodiment may adjust characteristics of the haptic output to emulate a feeling of interaction with a real-world counterpart of the virtual HID (e.g., a real-world counterpart of a virtual keyboard may be a keyboard of the same type, size, shape, and/or brand as the virtual keyboard, etc.). As a non-limiting practical example of the foregoing, a user that interacts with the keys of a virtual keyboard may experience substantially the same sensation as they would if interacting with a real-world version of the same type of keyboard.

The various embodiments described herein thus represent a technical improvement to conventional methods of providing haptic output to a user. Using the techniques described herein, an embodiment may first detect user input provided to a virtual HID in a virtual environment. An embodiment may then access sensation data associated with a user's interactions with a real-world counterpart of the virtual HID and thereafter provide, using the sensation data, haptic output to the user that emulates a feeling of interaction with the real-world HID. Such a method may provide for a more realistic and immersive virtual experience.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using a processor of an information handling device and in a virtual environment, a user input directed to a virtual human input device;
    accessing, from a data store, sensation data associated with user interaction with a real-world counterpart device of the virtual human input device, wherein acquiring the sensation data occurs during the user's normal utilization of the real-world counterpart device and comprises dynamically recording and passively collecting interaction data of the user with the real-world counterpart device, wherein the sensation data comprises a nature of a real-world environment associated with the user input directed to the virtual human input device and hand characteristic data, wherein the nature of the real-world environment comprises at least one contextual aspect of the environment; and
    providing, based on the sensation data and using a wearable haptic device, a haptic output responsive to the user input, wherein the haptic output emulates an interaction feel of the user input provided to the real-world counterpart device utilizing the sensation data to adjust characteristics of the haptic output to match characteristics of the sensation data, wherein the providing comprises modifying the sensation data utilized to provide the haptic output based upon the hand characteristic data.

2. The method of claim 1, wherein the virtual human input device is selected from the group consisting of: a virtual keyboard, a virtual touchpad, a virtual mouse, a virtual joystick, a virtual stylus, and a virtual trackball.

3. The method of claim 1, wherein the virtual environment is one of:
    an augmented reality (AR) environment and a virtual reality (VR) environment.

4. The method of claim 1, wherein the wearable haptic device is a haptic glove.

5. The method of claim 1, wherein the sensation data comprises interaction force data for a user interacting with the real-world counterpart device.

6. The method of claim 1, wherein the sensation data comprises orientation data associated with a user during provision of the user input to the virtual human input device.

7. The method of claim 1, wherein the hand characteristic data corresponds to at least one metric selected from the group consisting of: hand size data, finger size data, input posture data, input trajectory data, and input speed data.

8. The method of claim 1, wherein the sensation data comprises audible feedback data associated with user interaction with the real-world counterpart device.

9. The method of claim 1, wherein the sensation data is derived during a dedicated training period.

10. An information handling device, comprising:
    a sensor;
    a wearable haptic device;
    a processor;
    a memory device that stores instructions executable by the processor to:
    display a virtual object;
    detect, in a virtual environment, a user input directed to a virtual human input device;
    access, from a data store, sensation data associated with user interaction with a real-world counterpart device of the virtual human input device, wherein acquiring the sensation data occurs during the user's normal utilization of the real-world counterpart device and comprises dynamically recording and passively collecting interaction data of the user with the real-world counterpart device, wherein the sensation data comprises a nature of a real-world environment associated with the user input directed to the virtual human input device and hand characteristic data, wherein the nature of the real-world environment comprises at least one contextual aspect of the environment; and
    provide, based on the sensation data and using a wearable haptic device, a haptic output responsive to the user input, wherein the haptic output emulates an interaction feel of the user input provided to the real-world counterpart device utilizing the sensation data to adjust characteristics of the haptic output to match characteristics of the sensation data, wherein the providing comprises modifying the sensation data utilized to provide the haptic output based upon the hand characteristic data.

11. The information handling device of claim 10, wherein the virtual human input device is selected from the group consisting of: a virtual keyboard, a virtual touchpad, a virtual mouse, a virtual joystick, a virtual stylus, and a virtual trackball.

12. The information handling device of claim 10, wherein the virtual environment is one of: an augmented reality (AR) environment and a virtual reality (VR) environment.

13. The information handling device of claim 10, wherein the wearable haptic device is a haptic glove.

14. The information handling device of claim 10, wherein the sensation data comprises interaction force data for a user interacting with the real-world counterpart device.

15. The information handling device of claim 10, wherein the sensation data comprises orientation data associated with a user during provision of the user input to the virtual human input device.

16. The information handling device of claim 10, wherein the hand characteristic data corresponds to at least one metric selected from the group consisting of: hand size data, finger size data, input posture data, input trajectory data, and input speed data.

17. The information handling device of claim 10, wherein the sensation data comprises audible feedback data associated with user interaction with the real-world counterpart device.

18. A product, comprising:
    a storage device that stores code, the code being executable by a processor and comprising:
    code that detects, in a virtual environment, a user input directed to a virtual human input device;
    code that accesses, from a data store, sensation data associated with user interaction with a real-world counterpart device of the virtual human input device, wherein acquiring the sensation data occurs during the user's normal utilization of the real-world counterpart device and comprises dynamically recording and passively collecting interaction data of the user with the real-world counterpart device, wherein the sensation data comprises a nature of a real-world environment associated with the user input directed to the virtual human input device and hand characteristic data, wherein the nature of the real-world environment comprises at least one contextual aspect of the environment; and
    code that provides, based on the sensation data and on a wearable haptic device, a haptic output responsive to the user input, wherein the haptic output emulates an interaction feel of the user input provided to the real-world counterpart device utilizing the sensation data to adjust characteristics of the haptic output to match characteristics of the sensation data, wherein the providing comprises modifying the sensation data utilized to provide the haptic output based upon the hand characteristic data.

\* \* \* \* \*